Figure 1:
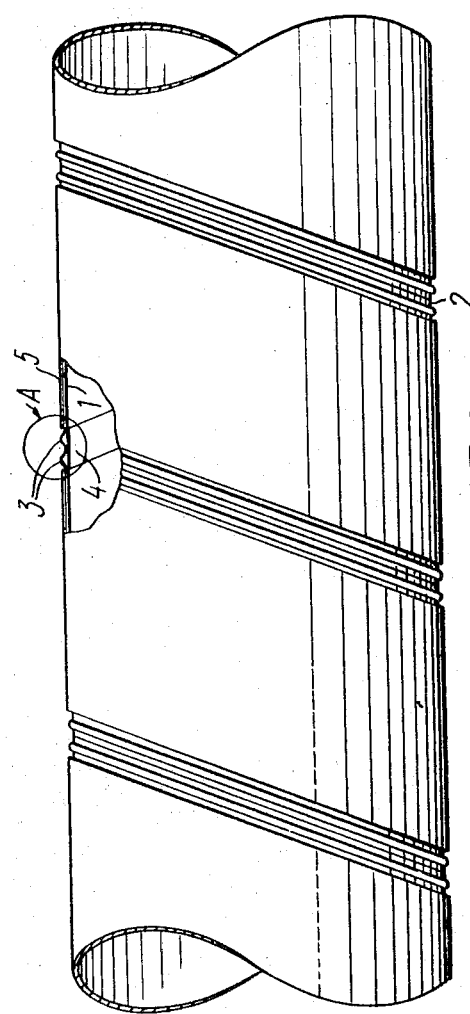

United States Patent [19]
Raevsky

[11] 3,847,185
[45] Nov. 12, 1974

[54] PIPELINE FOR USE UNDER CONDITIONS OF CONSIDERABLE VARIATIONS IN TEMPERATURE

[76] Inventor: Georgy Vladimirovich Raevsky, Kiev, perculok Mechnikova, 3, kv. 6, U.S.S.R.

[22] Filed: Apr. 10, 1972

[21] Appl. No.: 242,705

[52] U.S. Cl.................. 138/122, 138/134, 138/154
[51] Int. Cl. ........................ F16l 9/06, F16l 11/16
[58] Field of Search .......... 138/109, 121, 122, 153, 138/154, 173, 134, 114, 149

[56] References Cited
UNITED STATES PATENTS

| | | | |
|---|---|---|---|
| 689,688 | 12/1901 | Nodder | 138/173 |
| 1,453,220 | 4/1923 | Witzenmann | 138/173 |
| 2,934,095 | 4/1960 | Lockhart | 138/121 |
| 3,332,446 | 7/1967 | Mann | 138/122 |
| 3,383,875 | 5/1968 | Hass | 138/122 |
| 3,473,575 | 10/1969 | Vogelsang et al. | 138/114 |
| 3,550,639 | 12/1970 | Okuda | 138/121 |
| 3,578,029 | 5/1971 | Cullen | 138/123 |
| 3,687,169 | 8/1972 | Reynard | 138/124 |

FOREIGN PATENTS OR APPLICATIONS

| 5,555 | 11/1882 | Great Britain | 138/154 |
|---|---|---|---|

*Primary Examiner*—Herbert Goldstein
*Attorney, Agent, or Firm*—Waters, Roditi, Schwartz & Nissen

[57] ABSTRACT

A pipeline for use under conditions of considerable variations in temperature comprising pipes on which there is made at least a single corrugation disposed on a helical line along the pipeline and intended for compensating for thermal strains.

4 Claims, 2 Drawing Figures

PATENTED NOV 12 1974 3,847,185

PIPELINE FOR USE UNDER CONDITIONS OF CONSIDERABLE VARIATIONS IN TEMPERATURE

The present invention relates to pipelines and, more particularly, the invention relates to pipelines employed under conditions of considerable variations in temperature.

Such pipelines are laid above and under the ground level and are employed, for example, for transporting natural liquefied gas. They are composed of pipes connected one to another and provided with expansion bends. The pipes may be seamless or welded, straight-seam or spiral-seam. The expansion compensators consist either of loops or bends provided on the pipes or of separate devices in special chambers.

Under the effects of temperature variations, tensile or compressive stresses appear in the walls of the pipes. When the pipeline is laid above ground level, particularly in regions with constantly frozen ground, the thermal stresses reach a very high value.

The temperature variations are particularly great when the pipeline is used for transporting liquefied gases. The investigations have shown that the rated temperatures of a liquefied natural gas transported through main pipelines are within the range of $-120°$ to $-160°C$. In connection with such a low temperature of the transported product, the construction of the pipeline must meet special requirements.

The design of a low-temperature pipeline must provide compensation for thermal strains of the pipes which are cooled to the operating temperature. This relates to both suspended and subterranean pipelines. This compensation is more difficult to effect in the case of a subterranean line than in the case of a suspended line, since the pipe must be movable in a longitudinal direction. For this purpose, the pipe is placed into a protective case which through diaphragm type gaskets takes the weight of the pipe and the ground above the pipe. In this case the compensation for temperature strains is effected in separate chambers accommodating the compensators. The compensators may be either of the axial type or those using the compensating properties of the loop of the pipeline itself having various shapes (U-shaped, L-shaped, trapezoidal, etc.). The compensating ability of the axial compensators is low and their use is usually limited to a pressure of up to 20 atm. The compensators of the second type result in pressure losses and increase the amount of pipes by 8-9 percent.

There are several known systems of suspended pipelining i.e. laying of a pipeline with compensators, S-type or zig-zag laying of a pipeline with separate slightly bent portions, etc. In the first case the pipeline is laid along a straight line, while the compensation is effected due to the movement of the pipeline on its supports along the compensation axis. The disadvantages of this arrangement have been mentioned in the consideration of the subterranian pipelines. In the case of S-type laying of a pipeline, the compensation is effected due to the transverse displacements of the pipeline on the supports, and the pipeline must be located above the snow layer to provide the possibility of compensation for the strains. This considerably complicates the mounting of the pipeline and increases the quantity and dimensions of the supports. The length of a pipeline laid on an S-line is increased by 3-5 percent, and the length of that having slightly bent portions is increased by 2-3 percent.

Besides, pipelines of a great diameter feature a high bending stress and this fact impedes the laying of these pipes in accordance with the relief of the terrain.

Thus, the development of a means for reducing the cost of laying of the pipelines and providing for their reliable operation under conditions of considerable variations in temperature is associated with a number of difficulties.

An object of the present invention is to eliminate the above-mentioned disadvantages.

A specific object of the invention is provide a pipeline for use under conditions of considerable variations in temperature with a means for compensating for the thermal strains of the pipeline which is reliable in operation, convenient in laying on rough ground, and is featured by a low cost of production.

This object is attained by providing a pipeline for use under conditions of considerable temperature variations comprising a device for compensating for the thermal strains in which, according to the invention, this device consists of at least a single corrugation made directly on the pipes constituting this pipeline by means of plastic or permanent deformation of their walls, said corrugation being disposed on a helical line along the pipeline.

Such a pipeline operates as a self-compensating device upon any change in temperature. It is reliable in operation and convenient in laying along the route. Furthermore, this pipeline is economically expedient since it does not require the use of the known labor-consuming and insufficiently reliable compensators. Moreover, the pipe need not be placed into a casing so that the entire construction of the suspended pipeline is considerably simplified. In the case of a projection conduit, the pipeline is laid along a straight line without the provision of compensating bends in its plane.

The presence of corrugations disposed along a helical line will result in a change in the bending strength and torsional rigidity of the pipe.

The rigidity determining the minimum radii of the natural bending of the pipeline will be reduced, and this will enable the pipeline to be laid almost without changing the relief of the terrain.

The stiffness determining the stability of the section of the pipe will be increased, and this is desirable for large-diameter thin-walled pipes.

The pipeline can be made of a metallic roll blank in which the lateral longitudinal edges are connected through a weld joint disposed on a helical line along the pipeline in which the corrugation is located on a helical line equidistantly to the weld joint.

Such a corrugation may be made parallel to the edge either preliminarily on a blank or simultaneously with the shaping of the blank into a pipe.

This makes it possible to use high-quality wide-band roll steel from continuously operating mills. The use of rolled steel of this modern type will ensure a continuous process of making the pipes.

It is preferable to provide for a strap in the form of a metal band disposed along the corrugation and allowing for its thermal deformations. The strap closes the corrugation and forms a cylindrical surface internally in the pipeline.

This will exclude any increase in the hydraulic resistance of the pipeline and will prevent formation of sediments within the corrugations.

It is also preferred to provide at least one layer of a strengthening band between the turns of the corrugation, which band will increase the strength of the pipeline.

The pipeline thus obtained is capable of compensating for thermal strains appearing therein and is characterized by adequate strength.

The use of a multilayer strengthening band not only makes it possible to fully utilize the advantages of 2–6 mm roll steel (homogeneity, high mechanical properties, etc.), but also to make use of the effect of a multilayer structure, namely, a high margin of plasticity and warping as compared with monolithic walls, high resistance to cracking, limited and viscous character of breaking failures. In this case the main portion of the pipeline provided with the corrugations is preferably made of thin-sheet and cold-resistance steel, whereas the required strength of the pipeline is provided by winding a band of high-strength steel.

Figure 2:
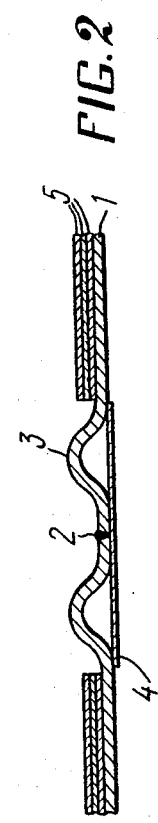

Other objects and advantages of the invention will be apparent from the following description of one embodiment of the invention with reference to the accompanying drawings, in which:

FIG. 1 is an elevational view, partly in section, of a pipeline made of a roll blank; and FIG. 2 is an enlarged view of detail A in FIG. 1.

The pipeline of the invention, adapted for use under conditions of considerable variations in temperature, comprises a plurality of interconnected pipes 1 (FIG.1) formed of a metal roll blank whose lateral edges are joined through a weld joint 2 disposed on a helical line along the pipeline. Preliminarily, prior to formation of the roll into a pipe or in the process of this formation, corrugations 3 are formed in a relatively limited transverse region at both lateral edges of the roll blank so that when the roll blank is wound the corrugations will be disposed equidistantly on both sides of the weld joint 2.

These corrugations 3 serve for compensation for thermal strain of the pipeline.

If the pipe 1 is of a small diameter or if deeper corrugations 3 are made, a strap 4 is preferably secured to the inner surface of the pipe 1 so as to close the corrugation. This strap 4 may be made in the form of a metallic band positioned along the corrugation (or corrugations) 3 on a helical line to provide a cylindrical inner surface in the pipeline. The strap 4 prevents penetration of the pumped fluid into the corrugations and the formation of sediments therein. This strap is secured to one of the bases of the corrugation 3 or to the weld joint 2 through one lateral edge so as not to interfere with the operation of the corrugation as a compensator, i.e. for its temperature deformations.

The strap 4 closing the corrugations may be secured to the edges of the roll blank in the process of welding of the pipe 1.

The strength of the pipe 1 may be increased by winding one or several layers of metallic roll bands 5 about the outer surface of the pipe between the turns of the corrugations 3.

The number of corrugations 3, their size and location on the pipe 1, as well as the amount of the strengthening bands 5, may be varied within a wide range.

The pipeline composed of pipes 1 has a longitudinal deformability sufficient for compensation of temperature elongations and contractions caused by the temperature variations of the ambient medium or of the material being transported through the pipeline. Also, this pipeline permits slight bending, when laying the pipes on rough terrain, so that they can follow the contour of the route.

The comparatively thin pipes 1 with corrugations 3 can resist rather high pressures due to the fact that on their outer surface between the turns of the corrugations 3 there is provided at least one layer of a steel strengthening band 5.

The positive effect of using the pipeline according to the invention is due to a number of advantages in the construction of the pipes and their placement along the route, as well as due to high reliability of operation of the pipeline.

The chief advantage consists in so called self-compensation of the pipeline, i.e. the possibility of its elongation and contraction at considerable variations in temperature. This eliminates the need for S-type laying of the pipeline and eliminates the use of separate comparatively complex compensators provided at some distance from one another which are unreliable in operation under considerable temperature variations.

The application of the above-described pipeline provides for considerable reduction of costs since the pipeline is laid along the shortest line and highstrength steel is used for winding the bands strengthening the pipeline.

Furthermore, by making a pipeline strengthened by the wound bands, the scope of the welding operations is reduced due to the fact that the weld joints are disposed only on a pipe with corrugations whose thickness constitutes merely a portion of the total thickness of the walls.

The laying of the pipeline made of the above-described tubes is less expensive compared with the known pipelines since the pipeline according to the invention can follow the route profile in a vertical plane and can be laid along the shortest line between stations.

Finally, the positive technical and economical effect of the operation of the proposed pipeline consists in increased reliability of its construction in the first place, because of the reduction of thermal stresses, and, in the second place, due to the making of the pipeline of multilayer roll steel whose thickness is much less than that of steel used for making the pipes with monolithic walls. It is well known that the reduction of the thickness of the steel under otherwise equal conditions increases the resistance of welded structures, operating under low temperatures, to brittle failures.

I claim:

1. A pipeline for use under conditions of substantial variations in temperature, said pipeline comprising a coiled roll blank having lateral edges joined by a weld joint disposed on a helical line along the pipeline, and means for compensating for thermal strains in said pipeline including at least one pair of corrugations formed in the wall of said pipeline along said helical line, one corrugation of said one pair being on each side of said helical line, said weld joint being equidistantly located between said corrugations of said one pair, said corrugations being disposed in a limited transverse region adjacent the lateral edges of the roll blank to form in succession a corrugation section of relatively small axial length and a smooth section of relatively great axial length along said pipeline.

2. A pipeline as claimed in claim 1 comprising a strap disposed internally in the pipes and covering the corrugations to form a continuous inner cylindrical surface in the pipeline, said strap comprising a helically wound metal band joined to the pipe by said weld joint.

3. A pipeline as claimed in claim 2 wherein said metal band is solid and impervious to the fluid conveyed in the pipeline to prevent entry thereof into the corrugations.

4. A pipeline as claimed in claim 1 comprising at least one layer of a strengthening band wound on the outer surface of the pipeline in the smooth section thereof between the corrugations.

* * * * *